US009158594B2

(12) United States Patent
Carey et al.

(10) Patent No.: US 9,158,594 B2
(45) Date of Patent: Oct. 13, 2015

(54) SYNCHRONIZING ACCESS TO RESOURCES IN A HYBRID COMPUTING ENVIRONMENT

(75) Inventors: James E. Carey, Rochester, MN (US); Jeffrey M. Ceason, Tucson, AZ (US); Philip J. Sanders, Rochester, MN (US); Gordon G. Stewart, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 13/491,850

(22) Filed: Jun. 8, 2012

(65) Prior Publication Data
US 2012/0246649 A1 Sep. 27, 2012

Related U.S. Application Data

(63) Continuation of application No. 12/360,930, filed on Jan. 28, 2009, now Pat. No. 8,255,909.

(51) Int. Cl.
*G06F 9/52* (2006.01)
*G06F 9/50* (2006.01)

(52) U.S. Cl.
CPC .............. *G06F 9/52* (2013.01); *G06F 9/5016* (2013.01); *G06F 9/5027* (2013.01); *G06F 9/526* (2013.01)

(58) Field of Classification Search
CPC combination set(s) only.
See application file for complete search history.

(56) References Cited

U.S. PATENT DOCUMENTS

| 4,989,131 | A |   | 1/1991  | Stone                      |
|-----------|---|---|---------|----------------------------|
| 5,073,851 | A |   | 12/1991 | Masterson et al.           |
| 5,142,676 | A | * | 8/1992  | Fried et al. ........ 711/152 |
| 5,363,484 | A |   | 11/1994 | Desnoyers et al.           |
| 5,467,459 | A |   | 11/1995 | Alexander et al.           |
| 5,548,761 | A |   | 8/1996  | Balasundaram et al.        |
| 5,590,345 | A |   | 12/1996 | Barker et al.              |
| 5,613,146 | A | * | 3/1997  | Gove et al. .......... 712/20 |
| 5,669,002 | A | * | 9/1997  | Buch ............... 710/200 |
| 5,835,961 | A |   | 11/1998 | Harvey et al.              |
| 5,873,127 | A |   | 2/1999  | Harvey et al.              |
| 5,983,329 | A |   | 11/1999 | Thaler et al.              |
| 6,061,773 | A |   | 5/2000  | Harvey et al.              |
| 6,070,194 | A |   | 5/2000  | Yu et al.                  |
| 6,125,430 | A |   | 9/2000  | Noel et al.                |

(Continued)

OTHER PUBLICATIONS

Final Office Action, U.S. Appl. No. 12/699,162, Aug. 8, 2012.

(Continued)

*Primary Examiner* — Eric Coleman
(74) *Attorney, Agent, or Firm* — Edward J. Lenart; James R. Nock; Kennedy Lenart Spraggins LLP

(57) ABSTRACT

Synchronizing access to resources in a hybrid computing environment that includes a host computer, a plurality of accelerators, the host computer and the accelerators adapted to one another for data communications by a system level message passing module, where synchronizing access to resources includes providing in a registry, to processes executing on the accelerators and the host computer, a key associated with a resource, the key having a value; attempting, by a process, to access the resource including determining whether a current value of the key represents an unlocked state for the resource; if the current value represents an unlocked state, attempting to lock access to the resource including setting the value to a unique identification of the process; determining whether the current value is the unique identification of the process; if the current value is the unique identification accessing the resource by the process.

18 Claims, 7 Drawing Sheets

(56) References Cited

U.S. PATENT DOCUMENTS

| | | | |
|---|---|---|---|
| 6,266,745 B1 | 7/2001 | De Backer et al. | |
| 6,275,857 B1 | 8/2001 | McCartney | |
| 6,308,255 B1 | 10/2001 | Gorishek et al. | |
| 6,330,659 B1 | 12/2001 | Poff et al. | |
| 6,377,979 B1 | 4/2002 | Yamashita et al. | |
| 6,473,849 B1 * | 10/2002 | Keller et al. | 712/30 |
| 6,553,411 B1 | 4/2003 | Dias et al. | |
| 6,556,659 B1 | 4/2003 | Bowman-Amuah | |
| 6,598,130 B2 | 7/2003 | Harris et al. | |
| 6,651,132 B1 | 11/2003 | Traut | |
| 6,658,522 B1 | 12/2003 | Martin et al. | |
| 6,848,106 B1 | 1/2005 | Hipp | |
| 6,918,070 B1 | 7/2005 | Sharma | |
| 6,948,034 B2 | 9/2005 | Aoki | |
| 7,383,330 B2 | 6/2008 | Moran et al. | |
| 7,418,574 B2 | 8/2008 | Mathur et al. | |
| 7,428,573 B2 | 9/2008 | McCanne et al. | |
| 7,436,824 B2 | 10/2008 | Pepenella | |
| 7,437,403 B2 | 10/2008 | Xue et al. | |
| 7,469,273 B2 | 12/2008 | Anderson et al. | |
| 7,478,154 B2 | 1/2009 | Cochran et al. | |
| 7,631,023 B1 | 12/2009 | Kaiser et al. | |
| 7,668,924 B1 | 2/2010 | Young et al. | |
| 7,725,905 B1 | 5/2010 | Doshi et al. | |
| 7,752,417 B2 | 7/2010 | Manczak et al. | |
| 7,814,295 B2 | 10/2010 | Inglett et al. | |
| 7,904,929 B1 | 3/2011 | Jaunin et al. | |
| 7,984,267 B2 | 7/2011 | Aho et al. | |
| 7,991,803 B2 | 8/2011 | Mercer et al. | |
| 8,001,206 B2 | 8/2011 | Archer et al. | |
| 8,010,718 B2 | 8/2011 | Archer et al. | |
| 8,037,217 B2 | 10/2011 | Arroyo et al. | |
| 8,132,106 B2 | 3/2012 | Low et al. | |
| 2002/0029289 A1 | 3/2002 | Byrne et al. | |
| 2002/0056033 A1 | 5/2002 | Huppenthal | |
| 2002/0108059 A1 | 8/2002 | Canion et al. | |
| 2002/0112091 A1 | 8/2002 | Schott et al. | |
| 2002/0184217 A1 | 12/2002 | Bisbee et al. | |
| 2003/0028751 A1 | 2/2003 | McDonald et al. | |
| 2003/0061432 A1 | 3/2003 | Huppenthal et al. | |
| 2003/0120723 A1 | 6/2003 | Bright et al. | |
| 2003/0226018 A1 | 12/2003 | Tardo et al. | |
| 2004/0221127 A1 | 11/2004 | Ang | |
| 2005/0273571 A1 | 12/2005 | Lyon et al. | |
| 2005/0278409 A1 | 12/2005 | Kutzik et al. | |
| 2005/0278680 A1 | 12/2005 | Mukherjee et al. | |
| 2006/0018341 A1 | 1/2006 | Pettey et al. | |
| 2006/0085789 A1 | 4/2006 | Laborczfalvi et al. | |
| 2006/0168435 A1 | 7/2006 | Svensson et al. | |
| 2006/0224830 A1 | 10/2006 | Davis et al. | |
| 2007/0112999 A1 | 5/2007 | Oney et al. | |
| 2007/0113227 A1 | 5/2007 | Oney et al. | |
| 2007/0150665 A1 * | 6/2007 | Arimilli et al. | 711/145 |
| 2007/0226807 A1 | 9/2007 | Ginter et al. | |
| 2007/0255802 A1 | 11/2007 | Aloni et al. | |
| 2007/0294505 A1 | 12/2007 | Traut et al. | |
| 2008/0028103 A1 | 1/2008 | Schlansker et al. | |
| 2008/0091855 A1 | 4/2008 | Moertl et al. | |
| 2008/0114937 A1 | 5/2008 | Reid et al. | |
| 2008/0183882 A1 | 7/2008 | Flynn et al. | |
| 2008/0222396 A1 | 9/2008 | Spracklen et al. | |
| 2008/0256330 A1 | 10/2008 | Wang et al. | |
| 2008/0259086 A1 | 10/2008 | Doi et al. | |
| 2008/0260297 A1 * | 10/2008 | Chung et al. | 382/307 |
| 2008/0288747 A1 | 11/2008 | Inglett et al. | |
| 2009/0024734 A1 | 1/2009 | Merbach et al. | |
| 2009/0080428 A1 | 3/2009 | Witkowski et al. | |
| 2009/0110326 A1 | 4/2009 | Kim et al. | |
| 2009/0182976 A1 | 7/2009 | Agesen | |
| 2009/0276601 A1 | 11/2009 | Kancherla | |
| 2010/0036940 A1 | 2/2010 | Carey et al. | |
| 2010/0058031 A1 | 3/2010 | Aho et al. | |
| 2010/0058356 A1 | 3/2010 | Aho et al. | |
| 2010/0064295 A1 | 3/2010 | Aho et al. | |
| 2010/0107243 A1 | 4/2010 | Moyer et al. | |
| 2010/0153541 A1 | 6/2010 | Arimilli et al. | |
| 2010/0191711 A1 | 7/2010 | Carey et al. | |
| 2010/0191822 A1 | 7/2010 | Archer et al. | |
| 2010/0191823 A1 | 7/2010 | Archer et al. | |
| 2010/0191909 A1 | 7/2010 | Archer et al. | |
| 2010/0191917 A1 | 7/2010 | Archer et al. | |
| 2010/0191923 A1 | 7/2010 | Archer et al. | |
| 2010/0192123 A1 | 7/2010 | Carey et al. | |
| 2010/0198997 A1 | 8/2010 | Archer et al. | |
| 2010/0250877 A1 | 9/2010 | Gaither et al. | |
| 2010/0274868 A1 | 10/2010 | Arroyo et al. | |
| 2011/0035556 A1 | 2/2011 | Aho et al. | |
| 2011/0191785 A1 | 8/2011 | Archer et al. | |
| 2011/0225226 A1 | 9/2011 | Archer et al. | |
| 2011/0225255 A1 | 9/2011 | Archer et al. | |
| 2011/0225297 A1 | 9/2011 | Archer et al. | |
| 2011/0238949 A1 | 9/2011 | Archer et al. | |
| 2011/0239003 A1 | 9/2011 | Archer et al. | |
| 2011/0267197 A1 | 11/2011 | Archer et al. | |
| 2011/0271059 A1 | 11/2011 | Aho et al. | |
| 2011/0271263 A1 | 11/2011 | Archer et al. | |
| 2012/0191920 A1 | 7/2012 | Aho et al. | |
| 2012/0192204 A1 | 7/2012 | Aho et al. | |
| 2013/0060844 A1 | 3/2013 | Archer et al. | |
| 2013/0179901 A1 | 7/2013 | Aho et al. | |
| 2013/0238860 A1 | 9/2013 | Archer et al. | |

OTHER PUBLICATIONS

Office Action, U.S. Appl. No. 12/360,158, Aug. 6, 2012.
Office Action, U.S. Appl. No. 13/416,636, Sep. 7, 2012.
Office Action, U.S. Appl. No. 13/439,479, Nov. 2, 2012.
Buonadonna, Phillip, Culler, David, "Queue Pair IP: A Hybrid Architecture for System Area Networks", Aug. 7, 2002, Computer Architecture, 2002. Proceedings. 29th Annual Symposium, pp. 247-256.
Brightwell, Rin, Doerfler, Doug, Underwood D., Keith, "A Preliminary Analysis of the Infiniband and XD1 Network Interfaces", Jun. 26, 2006, Parallel and Distribution Processing Symposium, 2006. IPDPS 2006. 20th International, 8 pp.
Rexford, Jennifer, Bonomi Flavio; Greenberg Albert, Wong Albert, "Scalable Architectures for Integrated Traffic Shaping and Link Scheduling in High-Speed ATM Switches", Jun. 5, 1997, IEEE Journal on Selected Areas in Communications, vol. 15 No. 5, pp. 938-9501.
Rabenseifner, Rolf, Some Aspects of Message-Passing on Future Hybrid Systems, www.springerlink.com [online], 2008 [accessed online on Nov. 12, 2010], URL: http://www.springerlink.com/content/m12170217065w185/l.
Ball, Stuart, "Introduction to direct memory access", www.eetimes.com [online], Oct. 14, 2003 [accessed online on Nov. 12, 2010], URL: http://www.eetimes.com/discussion/other/4024879/introduction-to-direct-memory-accessl.
Office Action, 12/189,342, Jul. 12, 2010, 32 pp.
Office Action, 12/204,352, Dec. 16, 2010, 9 pp.
Final Office Action, 12/189,342, Dec. 23, 2010, 35 pp.
Office Action, U.S. Appl. No. 12/362,137, Nov. 22, 2010, 12 pp.
Office Action, U.S. Appl. No. 12/364,590, Nov. 26, 2010, 12 pp.
Office Action, U.S. Appl. No. 12/361,910, Nov. 19, 2010, 12 pp.
Office Action, U.S. Appl. No. 12/428,646, Feb. 7, 2011, 13 pp.
Notice of Allowance, U.S. Appl. No. 12/204,352, Mar. 14, 2011, 12 pp.
Final Office Action, U.S. Appl. No. 12/362,137, Apr. 25, 2011, 13 pp.
Notice of Allowance, U.S. Appl. No. 12/364,590, Apr. 29, 2011, 10 pp.
Notice of Allowance, U.S. Appl. No. 12/361,910, Apr. 5, 2011, 11 pp.
Notice of Allowance, U.S. Appl. No. 12/204,842, Mar. 19, 2012, 8 pp.
Notice of Allowance, U.S. Appl. No. 12/204,391, Dec. 7, 2011, 9 pp.
Final Office Action, U.S. Appl. No. 12/358,663, Mar. 21, 2012, 19 pp.
Final Office Action, U.S. Appl. No. 12/359,383, Jan. 27, 2012, 26 pp.
Final Office Action, U.S. Appl. No. 12/361,943, Jan. 31, 2012, 13 pp.
Office Action, U.S. Appl. No. 12/360,158, Jan. 19, 2012, 39 pp.
Notice of Allowance, U.S. Appl. No. 12/537,377, Jan. 13, 2012, 17 pp.
Notice of Allowance, U.S. Appl. No. 12/248,646, Jun. 9, 2011, 13 pp.
Office Action, U.S. Appl. No. 12/699,162, Apr. 27, 2012, 29 pp.

(56) References Cited

OTHER PUBLICATIONS

Office Action, U.S. Appl. No. 12/360,930, Dec. 29, 2011, 22 pp.
Office Action, U.S. Appl. No. 12/204,391, Aug. 17, 2011, 15 pp.
Office Action, U.S. Appl. No. 12/358,663, Oct. 5, 2011, 26 pp.
Office Action, U.S. Appl. No. 12/359,383, Aug. 5, 2011, 26 pp.
Office Action, U.S. Appl. No. 12/361,943, Sep. 21, 2011, 20 pp.
Office Action, U.S. Appl. No. 12/189,342, Jul. 26, 2011, 19 pp.
Rexford, Jennifer, Bonomi Flavio; Greenberg Albert, Wong Albert, "Scalable Architectures for Integrated Traffic Shaping and Link Scheduling in High-Speed ATM Switches", Jun. 5, 1997, IEEE Journal on Selected Areas in Communications, vol. 15 No. 5, pp. 938-950.
Rabenseifner, Rolf, Some Aspects of Message-Passing on Future Hybrid Systems, www.springerlink.com [online], 2008 [accessed online on Nov. 12, 2010], URL: http://www.springerlink.com/content/m12170217065w185/.
Ball, Stuard, Introduction to direct memory access, www.eetimes.com [online], Oct. 14, 2003 [accessed online on Nov. 12, 2010], URL: http;//www.eetimes.com/discussion/other/4024879/introduction-to-direct-memory-access.
Office Action, U.S. Appl. No. 12/204,352, Dec. 16, 2010.
Final Office Action, U.S. Appl. No. 12/189,342, Dec. 23, 2010.
Office Action, U.S. Appl. No. 12/362,137, Nov. 22, 2010.
Office Action, U.S. Appl. No. 12/364,590, Nov. 26, 2010.
Office Action, U.S. Appl. No. 12/361,910, Nov. 19, 2010.
Martellaro, "Using the cell processor as an offload streaming assist for sessionization of network traffic for cross packet inspector", Aug. 2008, pp. 21-24.
Notice of Allowance, U.S. Appl. No. 12/358,663, Jan. 14, 2013.
RCE filed, U.S. Appl. No. 12/358,663, Mar. 21, 2013.
Office Action, U.S. Appl. No. 12/748,559, Feb. 21, 2013.
Office Action, U.S. Appl. No. 13/664,557, Feb. 1, 2013.
U.S. Appl. No. 12/204,842, filed Sep. 2008, Aho et al.
U.S. Appl. No. 12/204,352, filed Sep. 2008, Aho et al.
U.S. Appl. No. 12/204,391, filed Sep. 2008, Aho et al.
U.S. Appl. No. 12/189,342, filed Aug. 2008, Carey et al.
U.S. Appl. No. 12/358,663, filed Jan. 2009, Archer et al.
U.S. Appl. No. 12/699,162, filed Feb. 2010, Archer et al.
U.S. Appl. No. 12/362,137, filed Jan. 2009, Archer et al.
U.S. Appl. No. 12/359,383, filed Jan. 2009, Archer et al.
U.S. Appl. No. 12/361,943, filed Jan. 2009, Archer et al.
U.S. Appl. No. 12/360,930, filed Jan. 2009, Carey et al.
U.S. Appl. No. 12/364,590, filed Feb. 2009, Archer et al.
U.S. Appl. No. 12/360,158, filed Jan. 2009, Carey et al.
U.S. Appl. No. 12/537,377, filed Aug. 2009, Aho et al.
U.S. Appl. No. 12/361,910, filed Jan. 2009, Archer et al.
U.S. Appl. No. 12/428,646, filed Apr. 2009, Arroyo et al.
U.S. Appl. No. 12/771,627, filed Apr. 2010, Aho et al.

\* cited by examiner

SYNCHRONIZING ACCESS TO RESOURCES IN A HYBRID COMPUTING ENVIRONMENT

CROSS-REFERENCE TO RELATED APPLICATION

This application is a continuation application of and claims priority from U.S. patent application Ser. No. 12/360,930, filed on Jan. 28, 2009.

BACKGROUND OF THE INVENTION

1. Field of the Invention

The field of the invention is data processing, or, more specifically, methods, apparatus, and products for synchronizing access to resources in a hybrid computing environment.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output ('I/O') devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today have advanced such that some computing environments now include core components of different architectures which operate together to complete data processing tasks. Such computing environments are described in this specification as 'hybrid' environments, denoting that such environments include host computers and accelerators having different architectures. Although hybrid computing environments are more computationally powerful and efficient in data processing than many non-hybrid computing environments, such hybrid computing environments still present substantial challenges to the science of automated computing machinery.

SUMMARY OF THE INVENTION

Methods, apparatus, and products for synchronizing access to resources in a hybrid computing environment, the hybrid computing environment including a host computer having a host computer architecture, a plurality of accelerators having an accelerator architecture, the accelerator architecture optimized, with respect to the host computer architecture, for speed of execution of a particular class of computing functions, the host computer and the accelerators adapted to one another for data communications by a system level message passing module. Synchronizing access to resources in such a hybrid computing environment according to embodiments of the present invention includes providing in a registry, by the system level messaging passing module to processes executing on the accelerators and the host computer, a key associated with a resource accessible by each of the processes, the key having a value that represents access permissions for the resource; attempting, by a process, to access the resource, including determining whether a current value of the key in the registry represents an unlocked state for the resource; if the current value of the key in the registry represents an unlocked state for the resource, attempting, by the process, to lock access to the resource including setting the value of the key to a unique identification of the process attempting to access the resource; determining, by the process, whether the current value of the key is the unique identification of the process attempting to access the resource; if the current value of the key is the unique identification of the process attempting to access the resource, accessing the resource by the process; and if the current value of the key is not the unique identification of the process attempting to access the resource, the process is not currently authorized to access the resource.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
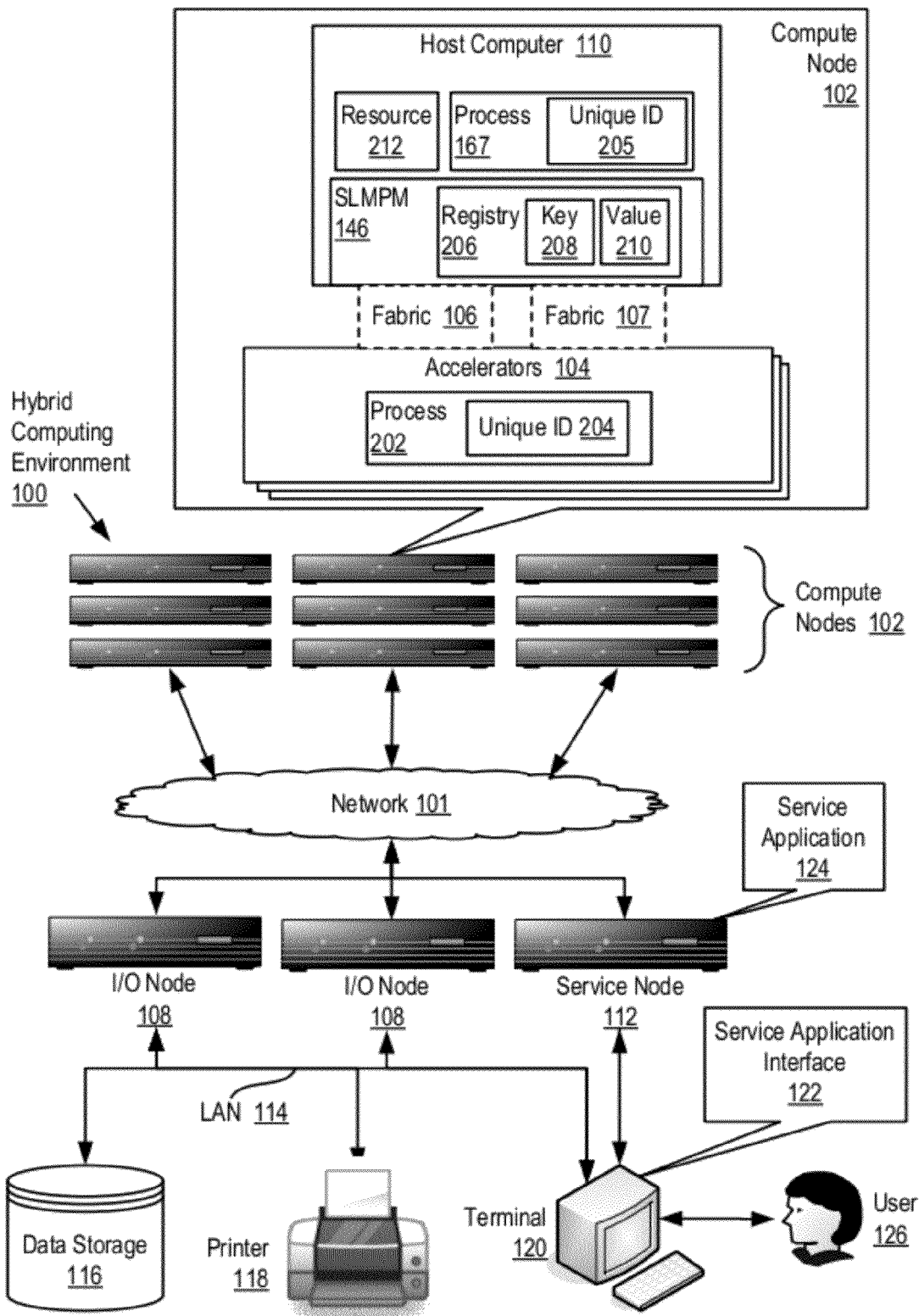
FIG. 1 sets forth a diagram of an example hybrid computing environment useful for synchronizing access to resources according to embodiments of the present invention.

Exemplary methods, apparatus, and products for synchronizing access to resources in a hybrid computing environment according to embodiments of the present invention are described with reference to the accompanying drawings, beginning with FIG. 1. FIG. 1 sets forth a diagram of an example hybrid computing environment (100) useful for synchronizing access to resources according to embodiments of the present invention. A 'hybrid computing environment,' as the term is used in this specification, is a computing environment in that it includes computer processors operatively coupled to computer memory so as to implement data processing in the form of execution of computer program instructions stored in the memory and executed on the processors. In addition, the hybrid computing environment (100) in the example of FIG. 1 includes at least one host computer having a host architecture that operates in cooperation with an accelerator having an accelerator architecture where the host architecture and accelerator architecture are different architectures. The host and accelerator architectures in this example are characterized by architectural registers, registers that are accessible by computer program instructions that execute on each architecture, registers such as, for example, an instruction register, a program counter, memory index registers, stack pointers, and the like.

That is, the number, type, structure, and relations among the architectural registers of the two architectures are different, so different that computer program instructions compiled for execution on the host computer of a hybrid computing environment typically cannot be executed natively by any associated accelerator of the hybrid computing environment.

Examples of hybrid computing environments include a data processing system that in turn includes one or more host computers, each having an x86 processor, and accelerators whose architectural registers implement the PowerPC instruction set. Computer program instructions compiled for execution on the x86 processors in the host computers cannot be executed natively by the PowerPC processors in the accelerators. Readers will recognize in addition that some of the example hybrid computing environments described in this specification are based upon the Los Alamos National Laboratory ('LANL') supercomputer architecture developed in the LANL Roadrunner project (named for the state bird of New Mexico), the supercomputer architecture that famously first generated a 'petaflop,' a million billion floating point operations per second. The LANL supercomputer architecture includes many host computers with dual-core AMD Opteron processors coupled to many accelerators with IBM Cell processors, the Opteron processors and the Cell processors having different architectures.

The example hybrid computing environment (100) of FIG. 1 includes a plurality of compute nodes (102), I/O nodes (108), and a service node (112). The compute nodes (102) are coupled through network (101) for data communications with one another and with the I/O nodes (108) and the service node (112). The data communications network (101) may be implemented as an Ethernet, Internet Protocol (In, PCIe, Infiniband, Fibre Channel, or other network as will occur to readers of skill in the art.

In the example hybrid computing environment (100) of FIG. 1, the compute nodes carry out principal user-level computer program execution, accepting administrative services, such as initial program loads and the like, from the service application (124) executing on the service node (112) and gaining access to data storage (116) and I/O functionality (118, 120) through the I/O nodes (108). In the example of FIG. 1, the I/O nodes (108) are connected for data communications to I/O devices (116, 118, 120) through a local area network ('LAN') (114) implemented using high-speed Ethernet or a data communications fabric of another fabric type as will occur to those of skill in the art. I/O devices in the example hybrid computing environment (100) of FIG. 1 include non-volatile memory for the computing environment in the form of data storage device (116), an output device for the hybrid computing environment in the form of printer (118), and a user (126) I/O device in the form of computer terminal (120) that executes a service application interface (122) that provides to a user an interface for configuring compute nodes in the hybrid computing environment and initiating execution by the compute nodes of principal user-level computer program instructions.

In the example of FIG. 1, each compute node includes a host computer (110) having a host computer architecture and one or more accelerators (104) having an accelerator architecture. A host computer (110) is a 'host' in the sense that it is the host computer that carries out interface functions between a compute node and other components of the hybrid computing environment external to any particular compute node. That is, it is the host computer that executes initial boot procedures, power on self tests, basic I/O functions, accepts user-level program loads from service nodes, and so on. An accelerator (104) is an 'accelerator' in that each accelerator has an accelerator architecture that is optimized, with respect to the host computer architecture, for speed of execution of a particular class of computing functions. Such accelerated computing functions include, for example, vector processing, floating point operations, and others as will occur to those of skill in the art.

Because each of the compute nodes in the example of FIG. 1 includes a host computer and an accelerator, readers of skill in the art will recognize that each compute node represents a smaller, separate hybrid computing environment within the larger hybrid computing environment (100) of FIG. 1. That is, not only may the combination of the compute nodes (102) form a hybrid computing environment (100), but it is also the case that each individual compute node may also be viewed as a separate, smaller hybrid computing environment. The hybrid computing environment (100) in the example of FIG. 1 then, may be viewed as composed of nine separate, smaller hybrid computing environments, one for each compute node, which taken together form the hybrid computing environment (100) of FIG. 1. Within each compute node (102) of FIG. 1, a host computer (110) and one or more accelerators (104) are adapted to one another for data communications by a system level message passing module ('SLMPM') (146) and by two or more data communications fabrics (106, 107) of at least two different fabric types. An SLMPM (146) is a module or library of computer program instructions that exposes an application programming interface ('API') to user-level applications for carrying out message-based data communications between the host computer (110) and the accelerator (104). Examples of message-based data communications libraries that may be improved for use as an SLMPM according to embodiments of the present invention include:

the Message Passing Interface or 'MPI,' an industry standard interface in two versions, first presented at Supercomputing 1994, not sanctioned by any major standards body,
 the Data Communication and Synchronization interface ('DACS') of the LANL supercomputer,
 the POSIX Threads library ('Pthreads'), an IEEE standard for distributed, multithreaded processing,
 the Open Multi-Processing interface ('OpenMP'), an industry-sanctioned specification for parallel programming, and
 other libraries that will occur to those of skill in the art.

A data communications fabric (106, 107) is a configuration of data communications hardware and software that implements a data communications coupling between a host computer and an accelerator. Examples of data communications fabric types include Peripheral Component Interconnect ('PCI'), PCI express ('PCIe'), Ethernet, Infiniband, Fibre Channel, Small Computer System Interface ('SCSI'), External Serial Advanced Technology Attachment ('eSATA'), Universal Serial Bus ('USB'), and so on as will occur to those of skill in the art.

The hybrid computing environments (100) in the example of FIG. 1 are configured for synchronizing access to resources according to embodiments of the present invention by providing in a registry (206), by the system level messaging passing module (146) to processes (167, 202) executing on the accelerators and the host computer, a key (208) associated with a resource (212) accessible by each of the processes (167, 202), the key (208) having a value (210) that represents access permissions for the resource (212); attempting, by a process (167, 202), to access the resource (212) including determining whether a current value (210) of the key (208) in the registry (206) represents an unlocked state for the resource (212); if the current value (210) of the key (208) in the registry (206) represents an unlocked state for the resource (212), attempting, by the process (167, 202), to lock access to the resource (212) including setting the value (210) of the key (208) to a unique identification of the process (167, 202) attempting to access the resource (212); determining, by the process (167, 202), whether the current value (210) of the key (208) is the unique identification of the process (167, 202) attempting to access the resource (212); if the current value (210) of the key (208) is the unique identification of the process (167, 202) attempting to access the resource (212), accessing the resource (212) by the process (167, 202); and if the current value (210) of the key (208) is not the unique identification of the process (167, 202) attempting to access the resource (212), the process (167, 202) is not currently authorized to access the resource (212).

The arrangement of compute nodes, data communications fabrics, networks, I/O devices, service nodes, I/O nodes, and so on, making up the hybrid computing environment (100) as illustrated in FIG. 1 are for explanation only, not for limitation of the present invention. Hybrid computing environments capable of synchronizing access to resources according to embodiments of the present invention may include additional nodes, networks, devices, and architectures, not shown in FIG. 1, as will occur to those of skill in the art. Although the hybrid computing environment (100) in the example of FIG. 1 includes only nine compute nodes (102), readers will note that hybrid computing environments according to embodiments of the present invention may include any number of compute nodes. The LANL supercomputer, taken as an example of a hybrid computing environment with multiple compute nodes, contains as of this writing more than 12,000 compute nodes. Networks and data communications fabrics in such hybrid computing environments may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Figure 2:
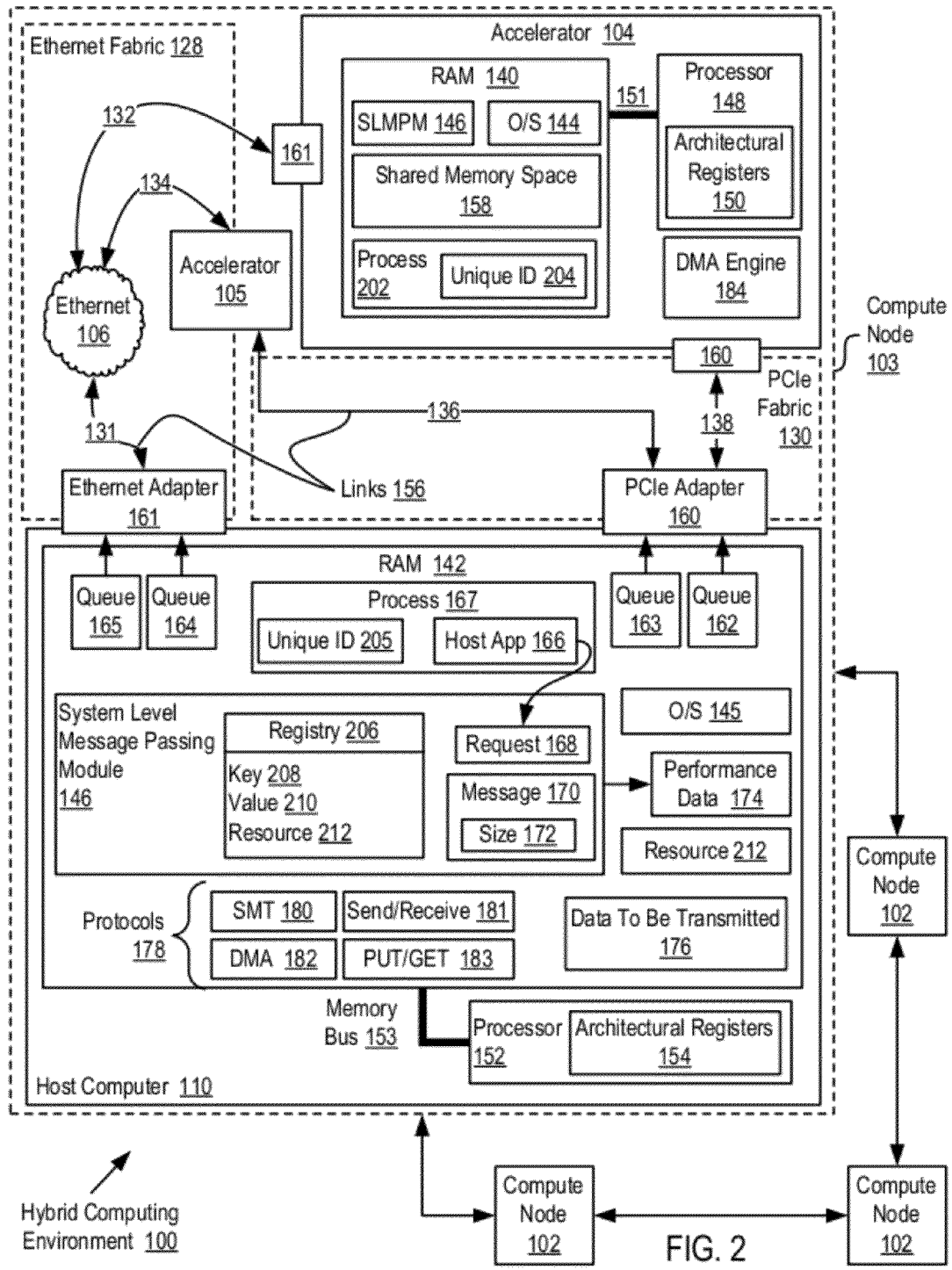
FIG. 2 sets forth a block diagram of an exemplary hybrid computing environment useful for synchronizing access to resources according to embodiments of the present invention.

For further explanation, FIG. 2 sets forth a block diagram of an exemplary hybrid computing environment (100) useful for synchronizing access to resources according to embodiments of the present invention. The hybrid computing environment (100) of FIG. 2 includes four compute nodes. Similar to the compute nodes of FIG. 1, each of the compute nodes in the example of FIG. 2 may represent a small, separate hybrid computing environment which taken together make up a larger hybrid computing environment. One compute node (103) in the example of FIG. 2 is illustrated in an expanded view to aid a more detailed explanation of such a hybrid computing environment (100). As shown in the expanded view of compute node (103), each of the compute nodes (102, 103) in the example of FIG. 2 includes a host computer (110). The host computer (110) includes a computer processor (152) operatively coupled to computer memory, Random Access Memory ('RAM') (142), through a high speed memory bus (153). The processor (152) in each host computer (110) has a set of architectural registers (154) that defines the host computer architecture.

Each of the compute nodes also includes one or more accelerators (104, 105). Each accelerator (104, 105) includes a computer processor (148) operatively coupled to RAM (140) through a high speed memory bus (151). Stored in RAM (140,142) of the host computer and the accelerators (104, 105) is an operating system (145). Operating systems useful in host computers and accelerators of hybrid computing environments according to embodiments of the present invention include UNIX™, Linux™, Microsoft XP™, Microsoft Vista™, Microsoft NT™, AIX™, IBM's i5/OS™, and others as will occur to those of skill in the art. There is no requirement that the operating system in the host computers should be the same operating system used on the accelerators.

The processor (148) of each accelerator (104, 105) has a set of architectural registers (150) that defines the accelerator architecture. The architectural registers (150) of the processor (148) of each accelerator are different from the architectural registers (154) of the processor (152) in the host computer (110). With differing architectures, it would be uncommon, although possible, for a host computer and an accelerator to support the same instruction sets. As such, computer program instructions compiled for execution on the processor (148) of an accelerator (104) generally would not be expected to execute natively on the processor (152) of the host computer (110) and vice versa. Moreover, because of the typical differences in hardware architectures between host processors and accelerators, computer program instructions compiled for execution on the processor (152) of a host computer (110) generally would not be expected to execute natively on the processor (148) of an accelerator (104) even if the accelerator supported the instruction set of the host. The accelerator architecture in example of FIG. 2 is optimized, with respect to the host computer architecture, for speed of execution of a particular class of computing functions. That is, for the function or functions for which the accelerator is optimized, execution of those functions will proceed faster on the accelerator than if they were executed on the processor of the host computer.

In the example of FIG. 2, the host computer (110) and the accelerators (104, 105) are adapted to one another for data communications by a system level message passing module ('SLMPM') (146) and two data communications fabrics (128, 130) of at least two different fabric types. In this example, to support message-based data communications between the host computer (110) and the accelerator (104), both the host computer (110) and the accelerator (104) have an SLMPM (146) so that message-based communications can both originate and be received on both sides of any coupling for data communications. Also in the example of FIG. 2, the host computer (110) and the accelerators (104, 105) are adapted to one another for data communications by a PCIe fabric (130) through PCIe communications adapters (160) and an Ethernet fabric (128) through Ethernet communications adapters (161). The use of PCIe and Ethernet is for explanation, not for limitation of the invention. Readers of skill in the art will immediately recognize that hybrid computing environments according to embodiments of the present invention may include fabrics of other fabric types such as, for example, PCI, Infiniband, Fibre Channel, SCSI, eSATA, USB, and so on.

The SLMPM (146) in this example operates generally for data processing in a hybrid computing environment (100) by monitoring data communications performance for a plurality of data communications modes between the host computer (110) and the accelerators (104, 105), receiving a request (168) to transmit data according to a data communications mode from the host computer to an accelerator, determining whether to transmit the data according to the requested data communications mode, and if the data is not to be transmitted according to the requested data communications mode: selecting another data communications mode and transmitting the data according to the selected data communications mode. In the example of FIG. 2, the monitored performance is illustrated as monitored performance data (174) stored by the SLMPM (146) in RAM (142) of the host computer (110) during operation of the compute node (103).

A data communications mode specifies a data communications fabric type, a data communications link, and a data communications protocol (178). A data communications link (156) is data communications connection between a host computer and an accelerator. In the example of FIG. 2, a link (156) between the host computer (110) and the accelerator (104) may include the PCIe connection (138) or the Ethernet connection (131, 132) through the Ethernet network (106). A link (156) between the host computer (110) and the accelerator (105) in the example of FIG. 2, may include the PCIe connection (136) or the Ethernet connection (131, 134) through the Ethernet network (106). Although only one link for each fabric type is illustrated between the host computer and the accelerator in the example of FIG. 2, readers of skill in the art will immediately recognize that there may any number of links for each fabric type.

A data communications protocol is a set of standard rules for data representation, signaling, authentication and error detection required to send information from a host computer (110) to an accelerator (104). In the example of FIG. 2, the SLMPM (146) may select one of several protocols (178) for data communications between the host computer (110) and the accelerator. Examples of such protocols (178) include shared memory transfers ('SMT') (180) executed with a send and receive operations (181), and direct memory access ('DMA') (182) executed with PUT and GET operations (183).

Shared memory transfer is a data communications protocol for passing data between a host computer and an accelerator into shared memory space (158) allocated for such a purpose such that only one instance of the data resides in memory at any time. Consider the following as an example shared memory transfer between the host computer (110) and the accelerator (104) of FIG. 2. An application (166) requests (168) a transmission of data (176) from the host computer (110) to the accelerator (104) in accordance with the SMT (180) protocol. Such a request (168) may include a memory address allocated for such shared memory. In this example, the shared memory segment (158) is illustrated in a memory location on the accelerator (104), but readers will recognize that shared memory segments may be located on the accelerator (104), on the host computer (110), on both the host computer and the accelerator, or even off the local compute node (103) entirely—so long as the segment is accessible as needed by the host and the accelerator. To carry out a shared memory transfer, the SLMPM (146) on the host computer (110) establishes a data communications connection with the SLMPM (146) executing on the accelerator (104) by a handshaking procedure similar to that in the TCP protocol. The SLMPM (146) then creates a message (170) that includes a header and a payload data and inserts the message into a message transmit queue for a particular link of a particular fabric. In creating the message, the SLMPM inserts, in the header of the message, an identification of the accelerator and an identification of a process executing on the accelerator. The SLMPM also inserts the memory address from the request (168) into the message, either in the header or as part of the payload data. The SLMPM also inserts the data (176) to be transmitted in the message (170) as part of the message payload data. The message is then transmitted by a communications adapter (160, 161) across a fabric (128, 130) to the SLMPM executing on the accelerator (104) where the SLMPM stores the payload data, the data (176) that was transmitted, in shared memory space (158) in RAM (140) in accordance with the memory address in the message.

Direct memory access ('DMA') is a data communications protocol for passing data between a host computer and an accelerator with reduced operational burden on the computer processor (152). A DMA transfer essentially effects a copy of a block of memory from one location to another, typically from a host computer to an accelerator or vice versa. Either or both a host computer and accelerator may include DMA engine, an aggregation of computer hardware and software for direct memory access. Direct memory access includes reading and writing to memory of accelerators and host computers with reduced operational burden on their processors.

A DMA engine of an accelerator, for example, may write to or read from memory allocated for DMA purposes, while the processor of the accelerator executes computer program instructions, or otherwise continues to operate. That is, a computer processor may issue an instruction to execute a DMA transfer, but the DMA engine, not the processor, carries out the transfer.

In the example of FIG. 2, only the accelerator (104) includes a DMA engine (184) while the host computer does not. In this embodiment the processor (152) on the host computer initiates a DMA transfer of data from the host to the accelerator by sending a message according to the SMT protocol to the accelerator, instructing the accelerator to perform a remote 'GET' operation. The configuration illustrated in the example of FIG. 2 in which the accelerator (104) is the only device containing a DMA engine is for explanation only, not for limitation. Readers of skill in the art will immediately recognize that in many embodiments, both a host computer and an accelerator may include a DMA engine, while in yet other embodiments only a host computer includes a DMA engine.

To implement a DMA protocol in the hybrid computing environment of FIG. 2 some memory region is allocated for access by the DMA engine. Allocating such memory may be carried out independently from other accelerators or host computers, or may be initiated by and completed in cooperation with another accelerator or host computer. Shared memory regions, allocated according to the SMA protocol, for example, may be memory regions made available to a DMA engine. That is, the initial setup and implementation of DMA data communications in the hybrid computing environment (100) of FIG. 2 may be carried out, at least in part, through shared memory transfers or another out-of-band data communications protocol, out-of-band with respect to a DMA engine. Allocation of memory to implement DMA transfers is relatively high in latency, but once allocated, the DMA protocol provides for high bandwidth data communications that requires less processor utilization than many other data communications protocols.

A direct 'PUT' operation is a mode of transmitting data from a DMA engine on an origin device to a DMA engine on a target device. A direct 'PUT' operation allows data to be transmitted and stored on the target device with little involvement from the target device's processor. To effect minimal involvement from the target device's processor in the direct 'PUT' operation, the origin DMA engine transfers the data to be stored on the target device along with a specific identification of a storage location on the target device. The origin DMA knows the specific storage location on the target device because the specific storage location for storing the data on the target device has been previously provided by the target DMA engine to the origin DMA engine.

A remote 'GET' operation, sometimes denominated an 'rGET,' is another mode of transmitting data from a DMA engine on an origin device to a DMA engine on a target device. A remote 'GET' operation allows data to be transmitted and stored on the target device with little involvement from the origin device's processor. To effect minimal involvement from the origin device's processor in the remote 'GET' operation, the origin DMA engine stores the data in an storage location accessible by the target DMA engine, notifies the target DMA engine, directly or out-of-band through a shared memory transmission, of the storage location and the size of the data ready to be transmitted, and the target DMA engine retrieves the data from storage location.

Monitoring data communications performance for a plurality of data communications modes may include monitoring a number of requests (168) in a message transmit request queue (162-165) for a data communications link (156). In the example of FIG. 2, each message transmit request queue (162-165) is associated with one particular data communications link (156). Each queue (162-165) includes entries for messages (170) that include data (176) to be transmitted by the communications adapters (160, 161) along a data communications link (156) associated with queue.

Monitoring data communications performance for a plurality of data communications modes may also include monitoring utilization of a shared memory space (158). In the example of FIG. 2, shared memory space (158) is allocated in RAM (140) of the accelerator. Utilization is the proportion of the allocated shared memory space to which data has been stored for sending to a target device and has not yet been read or received by the target device, monitored by tracking the writes and reads to and from the allocated shared memory. In the hybrid computing environment (100) of FIG. 2, shared memory space, any memory in fact, is limited. As such, a shared memory space (158) may be filled during execution of an application program (166) such that transmission of data from the host computer (110) to an accelerator may be slowed, or even stopped, due to space limitations in the shared memory space.

In some embodiments of the present invention, the hybrid computing environment (100) of FIG. 2 may be configured to operate as a parallel computing environment in which two or more instances the application program (166) executes on two or more host computers (110) in the parallel computing environment. In such embodiments, monitoring data communications performance across data communications modes may also include aggregating data communications performance information (174) across a plurality of instances of the application program (166) executing on two or more host computers in a parallel computing environment. The aggregated performance information (174) may be used to calculate average communications latencies for data communications modes, average number of requests in data communications links of a particular fabric type, average shared memory utilization among the plurality of host computers and accelerators in the parallel computing environment, and so on as will occur to those of skill in the art. Any combination of such measures may be used by the SLMPM for both determining whether to transmit the data according to requested data communications mode and selecting another data communications mode for transmitting the data if the data is not to be transmitted according to the requested data communications mode.

The SLMPM (146) of FIG. 2 receives, from an application program (166) on the host computer (110), a request (168) to transmit data (176) according to a data communications mode from the host computer (110) to the accelerator (104). Such data (176) may include computer program instructions compiled for execution by the accelerator (104), work piece data for an application program executing on the accelerator (104), or some combination of computer program instructions and work piece data. Receiving a request (168) to transmit data (176) according to a data communications mode may include receiving a request to transmit data by a specified fabric type, receiving a request to transmit data through a specified data communications link from the host computer to the accelerator, or receiving a request to transmit data from the host computer to the accelerator according to a protocol.

A request (168) to transmit data (176) according to a data communications mode may be implemented as a user-level application function call through an API to the SLMPM (146), a call that expressly specifies a data communications mode according to protocol, fabric type, and link. A request implemented as a function call may specify a protocol according to the operation of the function call itself. A dacs_put( ) function call, for example, may represent a call through an API exposed by an SLMPM implemented as a DACS library to transmit data in the default mode of a DMA 'PUT' operation. Such a call, from the perspective of the calling application and the programmer who wrote the calling application, represents a request to the SLMPM library to transmit data according to the default mode, known to the programmer to be default mode associated with the express API call. The called function, in this example dacs_put( ), may be coded according to embodiments of the present invention, to make its own determination whether to transmit the data according to the requested data communications mode, that is, according to the default mode of the called function. In a further example, a dacs_send( ) instruction may represent a call through an API exposed by an SLMPM implemented as a DACS library to transmit data in the default mode of an SMT 'send' operation, where the called function dacs_send( ) is again coded according to embodiments of the present invention to make its own determination whether to transmit the data according to the requested mode.

An identification of a particular accelerator in a function call may effectively specify a fabric type. Such a function call may include as a call parameters an identification of a particular accelerator. An identification of a particular accelerator by use of a PCIe ID, for example, effectively specifies a PCI fabric type. In another, similar, example, an identification of a particular accelerator by use of a media access control ('MAC') address of an Ethernet adapter effectively specifies the Ethernet fabric type. Instead of implementing the accelerator ID of the function call from an application executing on the host in such a way as to specify a fabric type, the function call may only include a globally unique identification of the particular accelerator as a parameter of the call, thereby specifying only a link from the host computer to the accelerator, not a fabric type. In this case, the function called may implement a default fabric type for use with a particular protocol. If the function called in the SLMPM is configured with PCIe as a default fabric type for use with the DMA protocol, for example, and the SLMPM receives a request to transmit data to the accelerator (104) according to the DMA protocol, a DMA PUT or DMA remote GET operation, the function called explicitly specifies the default fabric type for DMA, the PCIe fabric type.

In hybrid computing environments in which only one link of each fabric type adapts a single host computer to a single accelerator, the identification of a particular accelerator in a parameter of a function call, may also effectively specify a link. In hybrid computing environments where more than one link of each fabric type adapts a host computer and an accelerator, such as two PCIe links connecting the host computer (110) to the accelerator (104), the SLMPM function called may implement a default link for the accelerator identified in the parameter of the function call for the fabric type specified by the identification of the accelerator.

The SLMPM (146) in the example of FIG. 2 also determines, in dependence upon the monitored performance (174), whether to transmit the data (176) according to the requested data communications mode. Determining whether to transmit the data (176) according to the requested data communications mode may include determining whether to transmit data by a requested fabric type, whether to transmit data through a requested data communications link, or whether to transmit data according to a requested protocol.

In hybrid computing environments where monitoring data communications performance across data communications modes includes monitoring a number of requests in a message transmit request queue (162-165) for a data communications link, determining whether to transmit the data (176) according to the requested data communications mode may be carried out by determining whether the number of requests in the message transmit request queue exceeds a predetermined threshold. In hybrid computing environments where monitoring data communications performance for a plurality of data communications modes includes monitoring utilization of a shared memory space, determining whether to transmit the data (176) according to the requested data communications mode may be carried out by determining whether the utilization of the shared memory space exceeds a predetermined threshold.

If the data is not to be transmitted according to the requested data communications mode, the SLMPM (146) selects, in dependence upon the monitored performance, another data communications mode for transmitting the data and transmits the data (176) according to the selected data communications mode. Selecting another data communications mode for transmitting the data may include selecting, in dependence upon the monitored performance, another data communications fabric type by which to transmit the data, selecting a data communications link through which to transmit the data, and selecting another data communications protocol. Consider as an example, that the requested data communications mode is a DMA transmission using a PUT operation through link (138) of the PCIe fabric (130) to the accelerator (104). If the monitored data performance (174) indicates that the number of requests in transmit message request queue (162) associated with the link (138) exceeds a predetermined threshold, the SLMPM may select another fabric type, the Ethernet fabric (128), and link (131, 132) through which to transmit the data (176). Also consider that the monitored performance (176) indicates that current utilization of the shared memory space (158) is less than a predetermined threshold while the number of outstanding DMA transmissions in the queue (162) exceeds a predetermined threshold. In such a case, the SLMPM (146) may also select another protocol, such as a shared memory transfer, by which to transmit the data (174).

Selecting, by the SLMPM, another data communications mode for transmitting the data (172) may also include selecting a data communications protocol (178) in dependence upon data communications message size (172). Selecting a data communications protocol (178) in dependence upon data communications message size (172) may be carried out by determining whether a size of a message exceeds a predetermined threshold. For larger messages (170), the DMA protocol may be a preferred protocol as processor utilization in making a DMA transfer of a larger message (170) is typically less than the processor utilization in making a shared memory transfer of a message of the same size.

As mentioned above, the SLMPM may also transmit the data according to the selected data communications mode. Transmit the data according to the selected data communications mode may include transmitting the data by the selected data communications fabric type, transmitting the data through the selected data communications link, or transmitting the data according to the selected protocol. The SLMPM (146) may effect a transmission of the data according to the selected data communications mode by instructing, through a device driver, the communications adapter for the data communications fabric type of the selected data communications mode to transmit the message (170) according to a protocol of the selected data communications mode, where the message includes in a message header, an identification of the accelerator, and in the message payload, the data (176) to be transmitted.

The example hybrid computing environment (100) of FIG. 2 is configured for synchronous access to resources in accordance with embodiments of the present invention. Such resources may include I/O resources, data communications resources, logic resources, computer memory resources, computer processor resources, host computer hardware, accelerator hardware, processes executing on such host computer and accelerator, and so on as will occur to those of skill in the art. In some hybrid computing environments such resources may be scarce. A small amount of computer memory, even a particular memory region, for example, may used during operation of the hybrid computing environment by many processes executing on many different accelerators and host computers. As such, synchronized access of such resources increases optimization and efficiency of use of the resources. Such synchronization of access to a resource may also provide some amount of data integrity in a memory region where the data stored in the memory region may be accessed and manipulated by many different processes executing a host computer or accelerator.

In the example hybrid computing environment (100) of FIG. 2 each of the accelerators is executing a process (202) and the host computer is also executing a process (167) for a host application program (166). From time to time in the example hybrid computing environment (100) of FIG. 2 two or more of the processes may require access to the same resource simultaneously, that is, at nearly the same time. Consider as one example, the resource (212) depicted in the hybrid computing environment of FIG. 2, a memory region. When the process (202) executing on the accelerator (104) and the process (167) executing on the host computer (110) both attempt to access the resource simultaneously, to modify data in the memory region, for example, race conditions may occur and the data may become corrupt.

To minimize the effects of such race conditions between multiple processes executing in the example hybrid computing environment (100) of FIG. 2, among other effects that will occur to those of skill in the art, the system level message passing module (146) of FIG. 2 may be configured to provide in a registry (206), to processes (202, 167) executing on the accelerators (104, 105) and the host computer (110), a key (208) associated with a resource (212) accessible by each of the processes (202, 167). A 'registry' as the term is used in this specification may be any data structure, a table, an array, a list or the like that associates a resource or resource identity with a key that has a value. A 'key' as the term is used in this specification is a variable, known to processes executing in the hybrid computing environment (100), associated with a particular resource and used by processes in determining whether access to the resource is locked. Consider as an example of such a key associated with a resource the character string 'MemRsrcKey' associated in the registry (206) with a memory region. When a process inquires regarding the current state of access permissions for the memory region associated with the key, the processes uses as part of the inquiry the key, 'MemRsrcKey.' In the example hybrid computing environment (100) of FIG. 2, the key (208) has a value (210) that represents access permissions for the resource (212), that is, the value is used to control access to the resource (212). Consider for example, that a key having a value of zero may represent that access to the resource is unlocked, that is, any process may lock the resource then access the resource. Such a key having a value other than zero may represent that access to the resource locked. Access to a resource may be locked to all but one process by setting the value of the key equivalent to a unique identification ('ID') of that one process.

Providing a registry in the example of FIG. 2 may be carried out by the SLMPM (146) responsive to receiving from a process one or more calls through an API to one or more functions provided by the SLMPM (146) including as an argument of the calls the key to use and an identification of the resource. Consider as an example of a call to a function provided by an SLMPM (146) implemented as a DACS-like library dacs_mutex_init(MemRsrcKey, 0x100, 0x1000). Such a call is a request from a process, to initialize a mutex in a registry with a key, 'MemRsrcKey' associated with a memory region beginning at address 0x100 and ending at address 0x1000. The term 'mutex' is an abbreviated form of the term 'mutual exclusion.' Mutual exclusion functionality according to embodiments of the present invention is provided through the SLMPM (146) and avoids simultaneous use of a common resource. The SLMPM (146) after initializing the registry may then provide the key through data communications messages to each process executing in the hybrid computing environment responsive to a call from the process through an API to a function provided by the SLMPM (146). Upon receiving the key, each process may send an acknowledgement of the receipt to the SLMPM using a call through and API to another function provided by the SLMPM (146). Consider as an example of call to a function that causes the SLMPM to provide the key to each process in the hybrid computing environment the DACS-like function call dacs_mutex_share (MemRsrcKey), where the key 'MemRsrcKey' is then sent by data communications messages to each process. Consider as an acknowledgement of receipt of the key, the DACS-like call dacs_mutex_accept( ). Such a call may include arguments that identify the process calling the function such as an accelerator or host computer identity for the accelerator upon which the calling process is running, a process identifier for the process, a process identifier for the SLMPM (146) executing on the host computer or accelerator upon which the calling process is running, and so on as will occur to those of skill in the art.

Synchronizing access to the resource (212) in the example hybrid computing environment (100) of FIG. 2 according to embodiments of the present invention may include attempting, by a process (202, 167), to access the resource (212), including determining whether a current value (210) for the key (208) in the registry represents an unlocked state for the resource. If the current value (210) for the key (208) in the registry (206) represents an unlocked state for the resource (212), attempting, by the process (202, 167), to lock access to the resource (212) including setting the value (210) for the key (208) to a unique identification (204, 205) of the process (202, 167) attempting to access the resource (212). Synchronizing access to the resource (212) may also include determining whether the current value (210) is the unique identification (204, 205) of the process (202, 167) attempting to access the resource (212). If the value (210) is the unique identification (204, 205) of the process (202, 167) attempting to access the resource (212), the processes accesses the resource (212) and if the value (210) is not the unique identification (204, 205) of the process (202, 167) attempting to access the resource (212), the process (202, 167) is not currently authorized to access the resource (212) and must wait for the resource to be unlocked.

Attempting, by a process (202, 167), to access the resource (212) in the example of FIG. 2 may include determining whether a current value (210) for the key (208) in the registry represents an unlocked state for the resource. Determining whether a current value (210) for the key (208) in the registry represents an unlocked state for the resource may be carried out by a call from the process through an API to a function provided by the SLMPM (146), where the call includes as an argument the key. Consider as an example of a call to a DACS-like library to identify the current value of the key the function call dacs_mutex_trylock(MemRsrKey). Upon receiving such a call from a process, the SLMPM (146) may lookup the value of the key in the registry using as an index into the registry, the key itself. The SLMPM (146) may then send the value in a data communications message to the process as a return to the function call. As mentioned above, in some hybrid computing environments according to embodiments of the present invention, a value equal to zero represents an unlocked state for the resource. In such an embodiment determining whether current value represents an unlocked state is carried out by determining that the current value of the key is zero. Otherwise, the value is locked, that is, the process attempting to access the resource cannot access the resource at the current time.

If the current value (210) for the key (208) in the registry (206) does represent an unlocked state for the resource (212), the process (202, 167) attempts to lock access to the resource (212), that is, preclude other processes from accessing the resource. Attempting to lock access to the resource (212) may be carried out by setting, by the process (202, 167), the value (210) for the key (208) to a unique identification (204, 205) of the process (202, 167) attempting to access the resource (212). A unique identification (204, 205) of a process may be implemented in many ways such as, for example, a combination of a process identifier ('PID') of the process and a accelerator or host identification, a user specified value, an identification generated by the SLMPM in dependence upon the PID of the process and the PID of the instance of the SLMPM executing on the host or accelerator with the process, and so on as will occur to those of skill in the art. Setting the value to a unique identification of the process attempting to access the resource may be carried out by calling by the process through an API a function provided by the SLMPM (146) including as arguments of the function call the key and the value to set, the unique identification of the process. Consider as an example of such a DACS-like library call through an API to a function provided by an SLMPM (146), dacs_registry_set (MemRsrcKey=UniqueID001). Responsive to such a call, the SLMPM (146) updates the registry to include the value 'UniqueID001' for the key 'MemRsrcKey.'

In some embodiments a race to lock and access a currently unlocked resource may occur when two or more processes determine simultaneously, or at nearly the same time, that the value of the key represents an unlocked state of the resource. Consider an example in which two processes, process (202) and process (167), simultaneously determined that the value of the key associated with a resource represents that the resource is unlocked. Consider also that process (202) is first to set the value of the key to the unique ID (204), but directly thereafter the process (167) sets the value of key to the unique ID (205). In such a race between to lock and access the resource (212), the process to set the value last, in this example the process (167), effectively wins the race, locking all other processes from accessing the resource because no process will access the resource without again determining that the value of the key is, in fact, that process's unique identification. In this example, although process (202) was the first process (202) to lock access to the resource, the process (202) will determine that the value of key is, in fact, the unique ID (205) of the process (167). Determining whether the current value (210) of the key (208) is the unique identification (204, 205) of the process (202, 167) attempting to access the resource (212) may be carried out by again looking up the value (210) of the key (208) in the registry using a call by the process (167, 202) through an API to a function provided by the SLMPM (146) such as dacs_registry_get(MemRsrcKey).

If the value (210) is the unique identification (204, 205) of the process (202, 167) attempting to access the resource (212), the process may access the resource (212) in many ways in dependence upon the resource type, such as, for example, storing data to or reading data from a resource that is a memory region. If the value (210) is not the unique identification (204, 205) of the process (202, 167) attempting to access the resource (212), the process (202, 167) is not currently authorized to access the resource (212) and the process must wait until the resource is unlocked.

Figure 3:
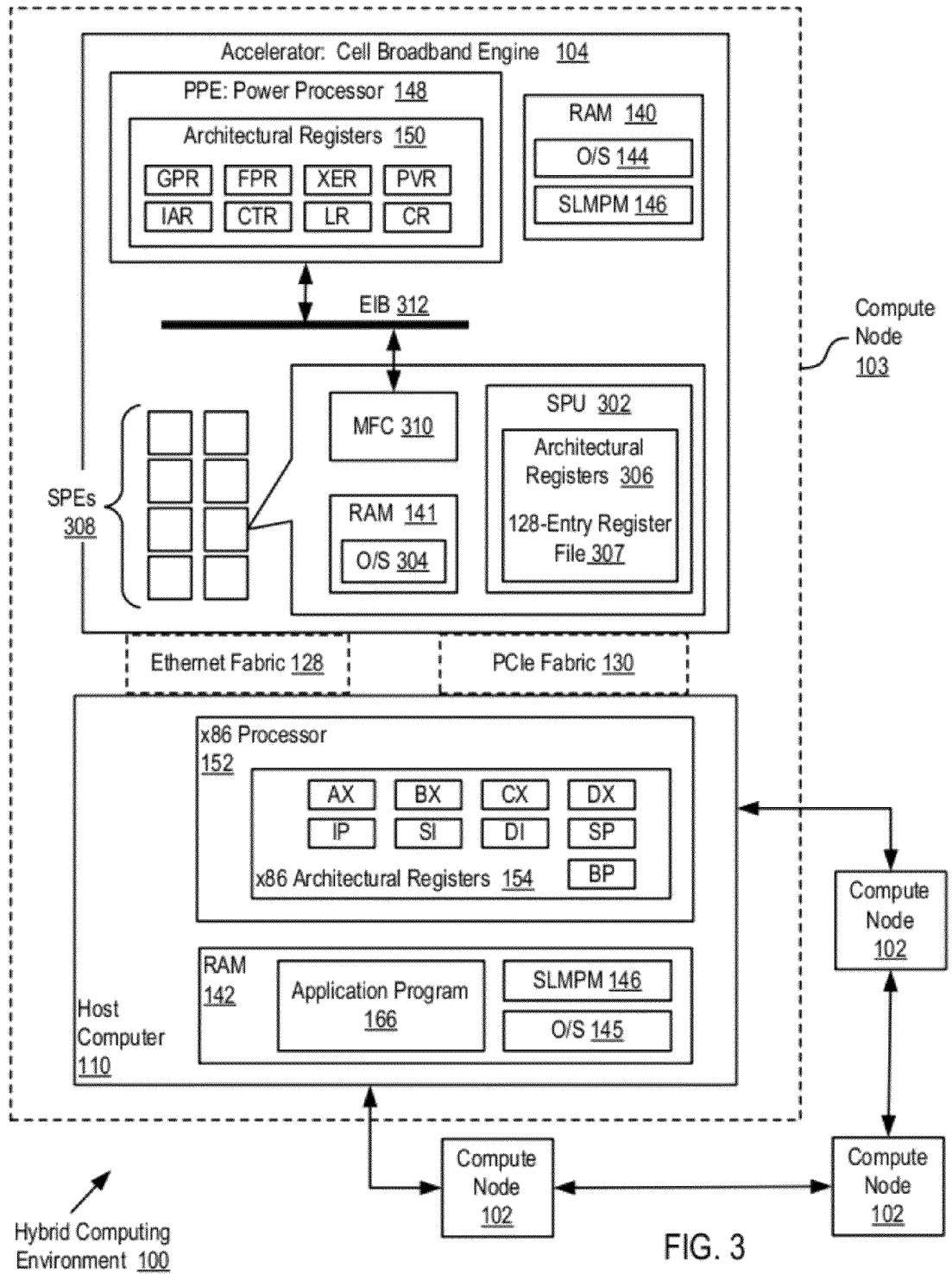
FIG. 3 sets forth a block diagram of a further exemplary hybrid computing environment useful for synchronizing access to resources according to embodiments of the present invention.

For further explanation, FIG. 3 sets forth a block diagram of a further exemplary hybrid computing environment (100) useful for synchronizing access to resources according to embodiments of the present invention. The hybrid computing environment of FIG. 3 is similar the hybrid computing environment of FIG. 2, including as it does, four compute nodes (102, 103), each of which includes a host computer (110) having a host computer architecture and an accelerator (104) having an accelerator architecture where the accelerator architecture is optimized, with respect to the host computer architecture, for speed of execution of a particular class of computing functions. The host computer (110) and the accelerator (104) are adapted to one another for data communications by a system level message passing module (146) and two or more data communications fabrics (128, 130) of at least two different fabric types. In the example of FIG. 3, the host computer (110) is adapted to accelerator (104) by an Ethernet fabric (128) and a PCIe fabric (130).

The host computer (110) as illustrated in the expanded view of the compute node (103) includes an x86 processor. An x86 processor is a processor whose architecture is based upon the architectural register set of the Intel x86 series of microprocessors, the 386, the 486, the 586 or Pentium™, and so on. Examples of x86 processors include the Advanced Micro Devices ('AMD') Opteron™, the AMD Phenom™, the AMD Athlon XP™, the AMD Athlon 64™, Intel Nehalam™, Intel Pentium 4, Intel Core 2 Duo, Intel Atom, and so on as will occur to those of skill in the art. The x86 processor (152) in the example of Figure illustrates a set of a typical architectural registers (154) found in many x86 processors including, for example, an accumulator register ('AX'), a base register ('BX'), a counter register ('CX'), a data register ('DX'), a source index register for string operations ('SI'), a destination index for string operations ('DI'), a stack pointer ('SP'), a stack base pointer for holding the address of the current stack frame ('BP'), and an instruction pointer that holds the current instruction address ('IP').

The accelerator (104) in the example of FIG. 3 is illustrated as a Cell Broadband Engine ('CBE') having a Cell Broadband Engine Architecture ('CBEA'). A CBEA is a microprocessor architecture jointly developed by Sony Computer Entertainment, Toshiba, and IBM, an alliance known as "STI." Microprocessors implemented according to the CBEA are sometimes referred to as 'Cell' processors or simply as CBEs. The CBEA combines a general-purpose POWER architecture core, a Power Processing Element ('PPE') (148), of modest performance with streamlined co-processing elements, called Synergistic Processing Elements ('SPEs') (308) which greatly accelerate multimedia and vector processing applications, as well as many other forms of dedicated computation. The CBE architecture emphasizes efficiency/watt, prioritizes bandwidth over latency, and favors peak computational throughput over simplicity of program code.

The accelerator (104) of FIG. 3, implemented as a CBE, includes a main processor (148) that in this example is a Power Processing Element ('PPE'), eight fully-functional co-processors called SPEs (308), and a high-bandwidth circular data bus connecting the PPE and the SPEs, called the Element Interconnect Bus ('EIB') (312). The PPE (148) is a POWER architecture processor with a two-way multi-threaded core acting as a controller for the eight SPEs (308). The term "POWER architecture" here refers to IBM's different generations of processor architectures, a broad term including all products based on POWER, PowerPC and Cell architectures. The architectural registers (150) of the PPE (148) of the CBE accelerator (104) therefore are different from those of the x86 processor (152) of the host computer (110). The PPE (148) of FIG. 3 includes an example set of architectural registers (150) of the POWER architecture, including 32 general purpose registers ('GPRs'), 32 floating point registers ('FPRs'), a fixed-point exception register ('XER'), a count register ('CTR'), a Condition register ('CR'), an instruction address register ('IAR'), a link register ('LR'), and a processor version register ('PVR').

The SPEs (308) handle most of the computational workload of the CBE (104). While the SPEs are optimized for vectorized floating point code execution, the SPEs also may execute operating systems, such as, for example, a lightweight, modified version of Linux with the operating system stored in local memory (141) on the SPE. Each SPE (308) in the example of FIG. 3 includes a Synergistic Processing Unit ('SPU') (302), and a Memory Flow Controller ('MFC') (310). An SPU (302) is a Reduced Instruction Set Computing ('RISC') processor with 128-bit single instruction, multiple data ('SIMD') organization for single and double precision instructions. In some implementations, an SPU may contain a 256 KB embedded Static RAM (141) for instructions and data, called local storage which is visible to the PPE (148) and can be addressed directly by software. Each SPU (302) can support up to 4 Gigabyte ('GB') of local store memory. The local store does not operate like a conventional CPU cache because the local store is neither transparent to software nor does it contain hardware structures that predict which data to load. The SPUs (302) also implement architectural registers (306) different from those of the PPE which include a 128-bit, 128-entry register file (307). An SPU (302) can operate on 16 8-bit integers, 8 16-bit integers, 4 32-bit integers, or 4 single precision floating-point numbers in a single clock cycle, as well as execute a memory operation.

The MFC (310) integrates the SPUs (302) in the CBE (104). The MFC (310) provides an SPU with data transfer and synchronization capabilities, and implements the SPU interface to the EIB (312) which serves as the transportation hub for the CBE (104). The MFC (310) also implements the communication interface between the SPE (308) and PPE (148), and serves as a data transfer engine that performs bulk data transfers between the local storage (141) of an SPU (302) and CBE system memory, RAM (140), through DMA. By offloading data transfer from the SPUs (302) onto dedicated data transfer engines, data processing and data transfer proceeds in parallel, supporting advanced programming methods such as software pipelining and double buffering. Providing the ability to perform high performance data transfer asynchronously and in parallel with data processing on the PPE (148) and SPEs (302), the MFC (310) eliminates the need to explicitly interleave data processing and transfer at the application level.

The SLMPM (146) in the example of FIG. 3 processes data in the hybrid computing environment (100) according to embodiments of the present invention by monitoring data communications performance for a plurality of data communications modes between the host computer (110) and the accelerator (104); receiving, from an application program (166) on the host computer (110), a request to transmit data according to a data communications mode from the host computer (110) to the accelerator (104); determining, in dependence upon the monitored performance, whether to transmit the data according to the requested data communications mode; and if the data is not to be transmitted according to the requested data communications mode: selecting, in dependence upon the monitored performance, another data communications mode for transmitting the data and transmitting the data according to the selected data communications mode.

The hybrid computing environment (100) in the example of FIG. 3 includes only one accelerator (104) adapted to a host computer (110) for clarity of explanation, not limitation. As mentioned above, hybrid computing environments (100) configured for synchronizing access to resources according to embodiments of the present invention may include any number of accelerators (104) adapted to a host computer (110). In a hybrid computing environment that includes multiple accelerators, configured otherwise as the example hybrid computing environment of FIG. 3, synchronizing access to resources according to embodiments of the present invention may include providing in a registry, by the system level messaging passing module (146) to processes executing on the accelerators (104) and the host computer (110), a key associated with a resource accessible by each of the processes, the key having a value that represents access permissions for the resource; attempting, by a process, to access the resource, including determining whether a current value of the key in the registry represents an unlocked state for the resource; if the current value of the key in the registry represents an unlocked state for the resource, attempting, by the process, to lock access to the resource including setting the value of the key to a unique identification of the process attempting to access the resource; determining, by the process, whether the current value of the key is the unique identification of the process attempting to access the resource; if the current value of the key is the unique identification of the process attempting to access the resource, accessing the resource by the process; and if the current value of the key is not the unique identification of the process attempting to access the resource, the process is not currently authorized to access the resource.

Figure 4:
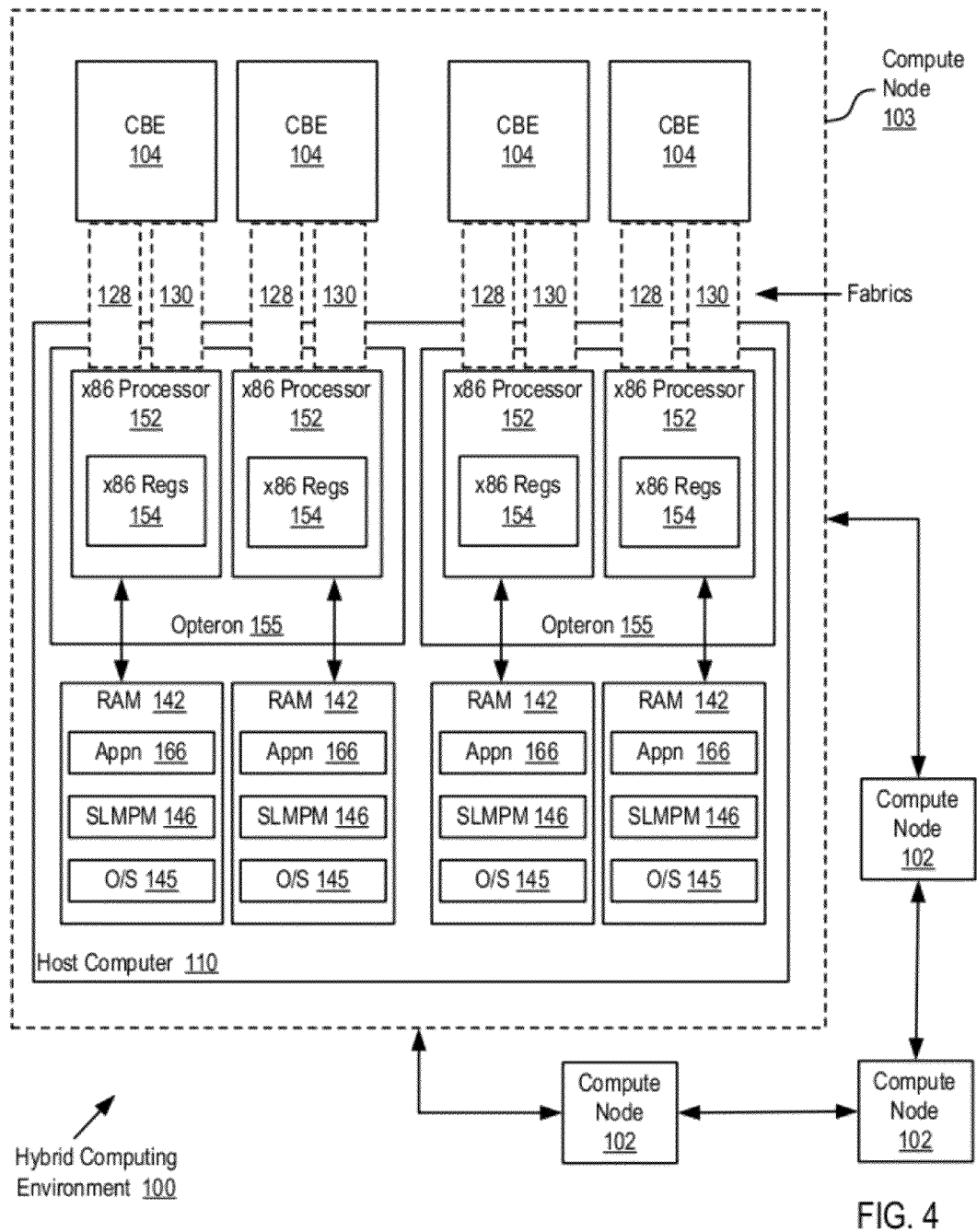
FIG. 4 sets forth a block diagram of a further exemplary hybrid computing environment useful for synchronizing access to resources according to embodiments of the present invention.

For further explanation, FIG. 4 sets forth a block diagram of a further exemplary hybrid computing environment (100) useful for synchronizing access to resources according to embodiments of the present invention. The hybrid computing environment of FIG. 4 is similar the hybrid computing environment of FIG. 2, including as it does, four compute nodes (102, 103), each of which includes a host computer (110) having a host computer architecture and one or more accelerators (104) each having an accelerator architecture where the accelerator architecture is optimized, with respect to the host computer architecture, for speed of execution of a particular class of computing functions. The host computer (110) and the accelerator (104) in the example of FIG. 4 are adapted to one another for data communications by a system level message passing module (146) and two or more data communications fabrics (128, 130) of at least two different fabric types. In the example of FIG. 4, the host computer (110) is adapted to accelerator (104) by an Ethernet fabric (128) and a PCIe fabric (130).

FIG. 4 illustrates an example of a hybrid computing environment similar to that implemented in the LANL supercomputer. The host computer (110), as illustrated by the expanded view of the compute node (103), implemented in the LANL supercomputer includes two AMD Opteron processors (155), each of which is a dual-core processor. Each of the cores (152) of the host computer (110) is illustrated in the example of FIG. 4 as a single, fully functional x86 processor core with each core having its own set of architectural registers (154). Each of the processor cores (152) in the example of FIG. 4 is operatively coupled to RAM (142) where an instance of an application program (166), an instance of the SLMPM (146), and an operating system (145) is stored. In the example of the LANL supercomputer, the SLMPM (146) is the Data Communication and Synchronization ('DACS') library improved according to embodiments of the present invention.

Each x86 processor core (152) in the example of FIG. 4 is adapted through an Ethernet (128) and PCIe (130) fabric to a separate accelerator (104) implemented as a CBE as described above with respect to FIG. 3. Each core (152) of each AMD Opteron processor (155) in the host computer (110) in this example is connected to at least one CBE. Although in this example the ratio of cores of the Opteron processors to CBEs (104) is one-to-one, readers of skill in the art will recognize that other example embodiments may implement different ratios of processor cores to accelerators such as, for example, one-to-two, one-to-three, and so on.

Each instance of the SLMPM (146) executing on each x86 processor core (152) in the example of FIG. 4 processes data in the hybrid computing environment (100) according to embodiments of the present invention by monitoring data communications performance across data communications modes between the host computer (110) and the accelerator (104) connected to the processor core (152); receiving, from the instance of the application program (166) executing on the processor core (152) of the host computer (110), a request to transmit data according to a data communications mode from the host computer (110) to the accelerator (104) connected to the processor core (152); determining, in dependence upon the monitored performance, whether to transmit the data according to the requested data communications mode; and if the data is not to be transmitted according to the requested data communications mode: selecting, in dependence upon the monitored performance, another data communications mode for transmitting the data and transmitting the data according to the selected data communications mode.

In the example hybrid computing environment (100) of FIG. 4, synchronizing access to resources according to embodiments of the present invention may include providing in a registry, by the system level messaging passing module (146) to processes executing on the accelerators (104) and the host computer (110), a key associated with a resource accessible by each of the processes, the key having a value that represents access permissions for the resource; attempting, by a process, to access the resource, including determining whether a current value of the key in the registry represents an unlocked state for the resource; if the current value of the key in the registry represents an unlocked state for the resource, attempting, by the process, to lock access to the resource including setting the value of the key to a unique identification of the process attempting to access the resource; determining, by the process, whether the current value of the key is the unique identification of the process attempting to access the resource; if the current value of the key is the unique identification of the process attempting to access the resource, accessing the resource by the process; and if the current value of the key is not the unique identification of the process attempting to access the resource, the process is not currently authorized to access the resource.

Figure 5:
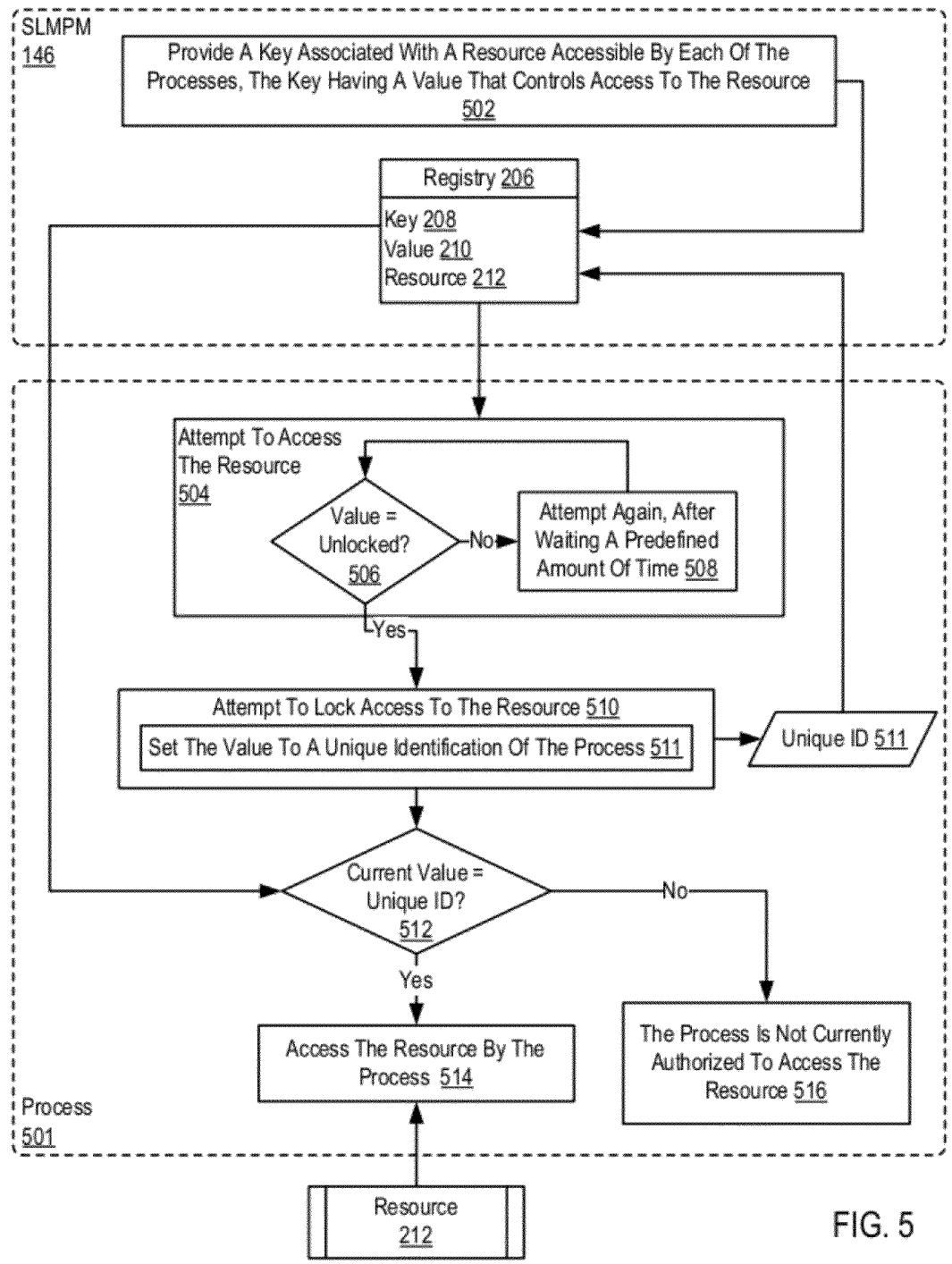
FIG. 5 sets forth a flow chart illustrating an exemplary method for synchronizing access to resources in a hybrid computing environment according to embodiments of the present invention.

For further explanation, FIG. 5 sets forth a flow chart illustrating an exemplary method for synchronizing access to resources in a hybrid computing environment according to embodiments of the present invention. The method of FIG. 5 is carried out in a hybrid computing environment similar to the hybrid computing environments described above in this specification. Such a hybrid computing environment includes a host computer (110 on FIG. 2) having a host computer architecture and a plurality of accelerators (104, 105 on FIG. 2) having an accelerator architecture, the accelerator architecture optimized, with respect to the host computer architecture, for speed of execution of a particular class of computing functions, the host computer (110 on FIG. 2) and the accelerators (104, 105 on FIG. 2) adapted to one another for data communications by an SLMPM (146) and, optionally, by two or more data communications fabrics (128, 130 on FIG. 2) of at least two different fabric types. The method of FIG. 5 includes providing (502) in a registry (206), by the system level messaging passing module (146) to processes (501) executing on the accelerators and the host computer, a key (208) associated with a resource (212) accessible by each of the processes (501). In the example of FIG. 5, the key (208) has a value (210) that represents access permissions for the resource (212). The method of FIG. 5 also includes attempting (504), by a process (501), to access the resource (212). In the method of FIG. 5, attempting (504), by a process (501), to access the resource (212) is carried out by determining (506) whether a current value (210) of the key (208) in the registry (206) represents an unlocked state for the resource (212). If the current value (210) of the key (208) in the registry (206) does not represent an unlocked state for the resource (212), the method of FIG. 5 continues by attempting (508) again by the resource after waiting a predefined amount of time. If the current value (210) of the key (208) in the registry (206) doe represent an unlocked state for the resource (212), the method of FIG. 5 continues by attempting (510), by the process (501), to lock access to the resource (212) including setting (511) the value (210) of the key (208) to a unique identification (511) of the process (511) attempting to access the resource (212). The method of FIG. 5 includes determining (512), by the process (501), whether the current value (210) of the key (210) is the unique identification (511) of the process (501) attempting to access the resource (212). If the current value (210) of the key (208) is the unique identification (511) of the process (501) attempting to access the resource (212), the method of FIG. 5 continues by accessing (514) the resource (212) by the process (501). If the current value (210) of the key (208) is not the unique identification (511) of the process (501) attempting to access the resource (212), the process (501) is not currently authorized to access the resource (212).

Figure 6:
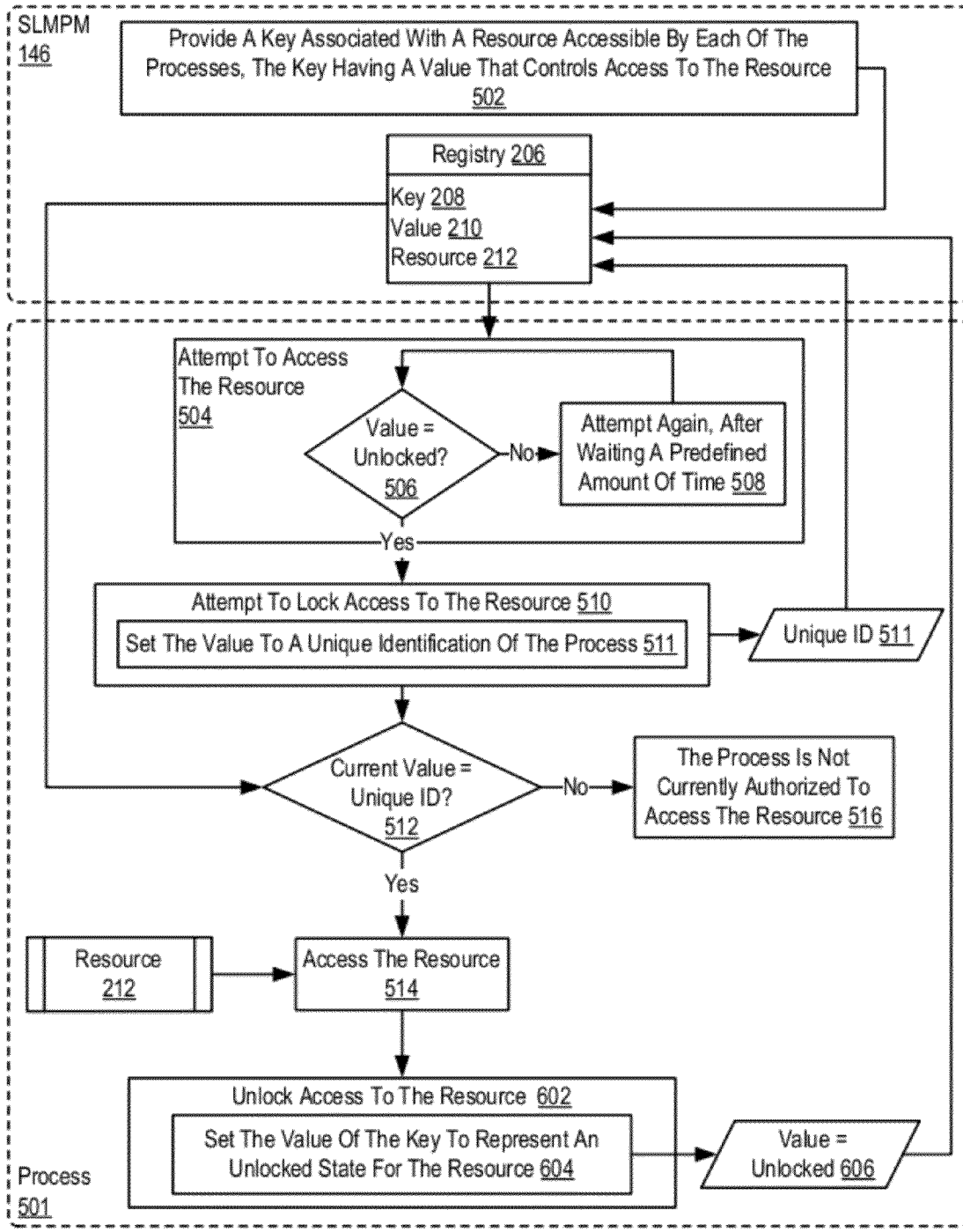
FIG. 6 sets forth a flow chart illustrating a further exemplary method for synchronizing access to resources in a hybrid computing environment according to embodiments of the present invention.

For further explanation, FIG. 6 sets forth a flow chart illustrating a further exemplary method for synchronizing access to resources in a hybrid computing environment according to embodiments of the present invention. The method of FIG. 6, like the method of FIG. 5 is carried out in a hybrid computing environment similar to the hybrid computing environments described above in this specification. Such a hybrid computing environment includes a host computer (110 on FIG. 2) having a host computer architecture and a plurality of accelerators (104, 105 on FIG. 2) having an accelerator architecture, the accelerator architecture optimized, with respect to the host computer architecture, for speed of execution of a particular class of computing functions, the host computer (110 on FIG. 2) and the accelerator (104, 105 on FIG. 2) adapted to one another for data communications by a system level message passing module (146) and, optionally, by two or more data communications fabrics (128, 130 on FIG. 2) of at least two different fabric types. The method of FIG. 6 is similar to the method of FIG. 5 including, as it does, providing (502) a key (208) associated with a resource (212), the key (208) having a value (210) that represents access permissions for the resource (212); attempting (504), by a process (501), to access the resource (212), including determining (506) whether a current value (210) of the key (208) in the registry (206) represents an unlocked state for the resource (212); if the current value (210) of the key (208) in the registry (206) represents an unlocked state for the resource (212), attempting (510), by the process (501), to lock access to the resource (212) including setting (511) the value (210) of the key (208) to a unique identification (511) of the process (511) attempting to access the resource; determining (512), by the process (501), whether the current value (210) of the key (210) is the unique identification (511) of the process (501) attempting to access the resource (212); if the current value (210) of the key (208) is the unique identification (511) of the process (501) attempting to access the resource (212), accessing (514) the resource (212) by the process (501); and if the current value (210) of the key (208) is not the unique identification (511) of the process (501) attempting to access the resource (212), the process (501) is not currently authorized to access the resource (212). The method of FIG. 6 differs from the method of FIG. 5, however, in that upon completing access of the resource by the process (501), the method of FIG. 6 includes unlocking (602), by the process (501), access to the resource (212). In the method of FIG. 6, unlocking (602) access to the resource (212) includes setting (604) the value (210) of the key (208) to represent an unlocked state for the resource.

Figure 7:
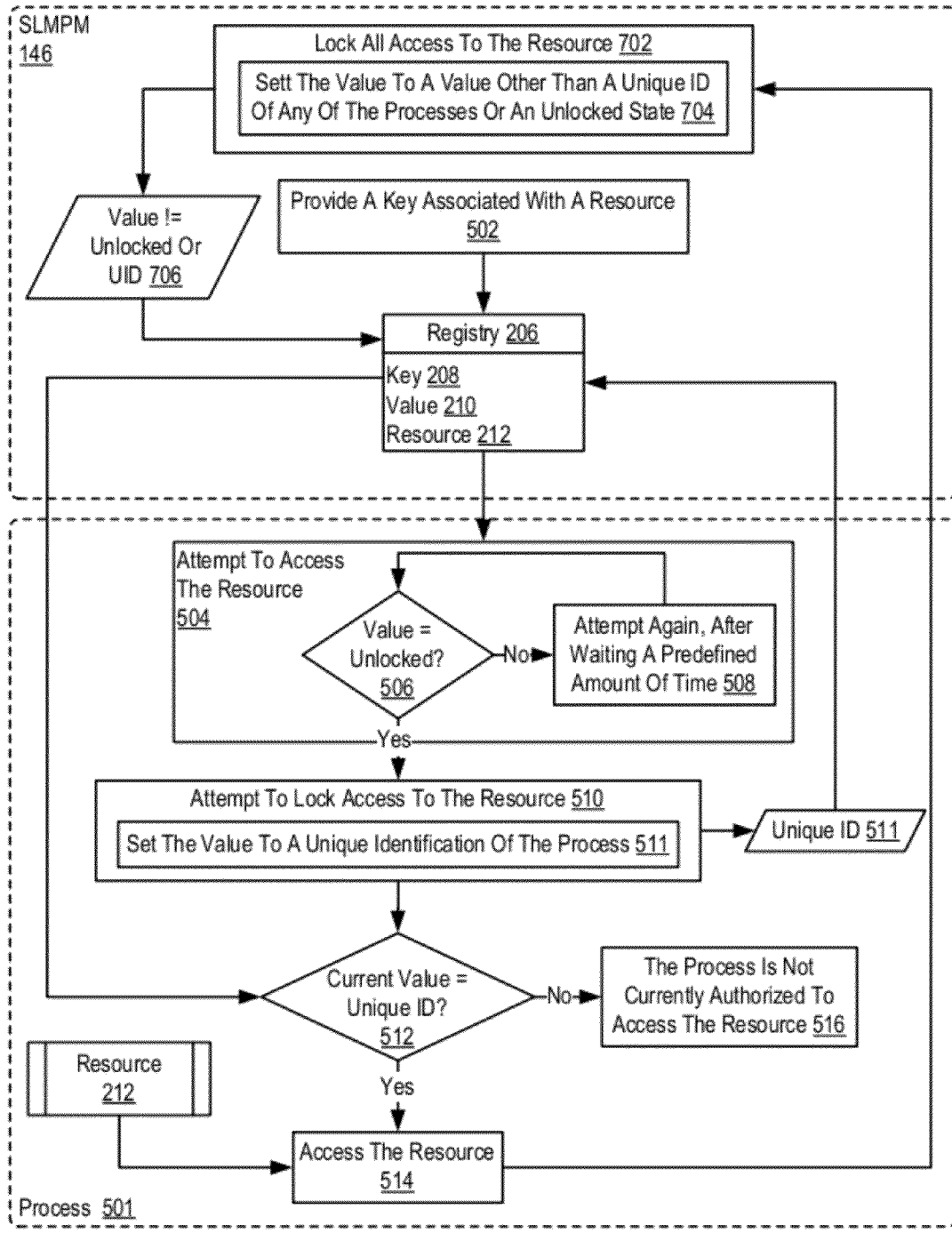
FIG. 7 sets forth a flow chart illustrating a further exemplary method for synchronizing access to resources in a hybrid computing environment according to embodiments of the present invention.

For further explanation, FIG. 7 sets forth a flow chart illustrating a further exemplary method for synchronizing access to resources in a hybrid computing environment according to embodiments of the present invention. The method of FIG. 7, like the method of FIG. 5 is carried out in a hybrid computing environment similar to the hybrid computing environments described above in this specification. Such a hybrid computing environment includes a host computer (110 on FIG. 2) having a host computer architecture and a plurality of accelerators (104, 105 on FIG. 2) having an accelerator architecture, the accelerator architecture optimized, with respect to the host computer architecture, for speed of execution of a particular class of computing functions, the host computer (110 on FIG. 2) and the accelerator (104, 105 on FIG. 2) adapted to one another for data communications by a system level message passing module (146) and, optionally, by two or more data communications fabrics (128, 130 on FIG. 2) of at least two different fabric types. The method of FIG. 7 is similar to the method of FIG. 5 including, as it does, providing (502) a key (208) associated with a resource (212), the key (208) having a value (210) that represents access permissions for the resource (212); attempting (504), by a process (501), to access the resource (212), including determining (506) whether a current value (210) of the key (208) in the registry (206) represents an unlocked state for the resource (212); if the current value (210) of the key (208) in the registry (206) represents an unlocked state for the resource (212), attempting (510), by the process (501), to lock access to the resource (212) including setting (511) the value (210) of the key (208) to a unique identification (511) of the process (511) attempting to access the resource; determining (512), by the process (501), whether the current value (210) of the key (210) is the unique identification (511) of the process (501) attempting to access the resource (212); if the current value (210) of the key (208) is the unique identification (511) of the process (501) attempting to access the resource (212), accessing (514) the resource (212) by the process (501); and if the current value (210) of the key (208) is not the unique identification (511) of the process (501) attempting to access the resource (212), the process (501) is not currently authorized to access the resource (212). The method of FIG. 7 differs from the method of FIG. 5, however, in that the method of FIG. 7 includes locking (702), by the system level message passing module (146), all access to the resource (212). In the method of Figure locking (702) all access to the resource (212) is carried out by setting (704), by the system level message passing module (146), the value (210) of the key (208) to a value (706) other than a unique identification of any of the processes or an unlocked state.

Exemplary embodiments of the present invention are described largely in the context of synchronizing access to resources in a fully functional hybrid computing environment. Readers of skill in the art will recognize, however, that method aspects of the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of synchronizing access to resources in a hybrid computing environment, the hybrid computing environment comprising a host computer having a host computer architecture, and a plurality of accelerators having an accelerator architecture, wherein the host computer architecture and the accelerator architecture are different architectures such that computer program instructions compiled for execution on the host computer cannot be executed natively by the plurality of accelerators of the hybrid computing environment, the host computer and the accelerators adapted to one another for data communications by a system level message passing module, the method comprising:

attempting, by a process, to access a resource including determining whether a current value of a key in a registry represents an unlocked state for the resource, wherein the registry is accessible by computer program instructions that execute on the host computer architecture and computer program instructions that execute on the accelerator architecture;

if the current value of the key in the registry represents an unlocked state for the resource, attempting, by the process, to lock access to the resource including setting the value of the key to a unique identification of the process attempting to access the resource;

determining, by the process, whether the current value of the key is the unique identification of the process attempting to access the resource; and if the current value of the key is the unique identification of the process attempting to access the resource, accessing the resource by the process.

2. The method of claim 1 wherein the process attempting to access the resource further comprises a process for a host application program executing on the host computer.

3. The method of claim 1 wherein the process attempting to access the resource further comprises a process executing on an accelerator.

4. The method of claim 1 further comprising, upon completing access of the resource by the process, unlocking, by the process, access to the resource including setting the value of the key to represent an unlocked state for the resource.

5. The method of claim 1 further comprising locking, by the system level message passing module, all access to the resource including setting the value of the key to a value other than a unique identification of any of the processes or an unlocked state.

6. The method of claim 1 wherein the host computer is adapted to each accelerator for data communications by two or more data communications fabrics of at least two different fabric types.

7. A hybrid computing environment for synchronizing access to resources, the hybrid computing environment comprising a host computer having a host computer architecture, and a plurality of accelerators having an accelerator architecture, wherein the host computer architecture and the accelerator architecture are different architectures such that computer program instructions compiled for execution on the host computer cannot be executed natively by the plurality of accelerators of the hybrid computing environment, the host computer and the accelerators adapted to one another for data communications by a system level message passing module, the hybrid computing environment further comprising a computer processor, a computer memory operatively coupled to the computer processor, the computer memory having disposed within it computer program instructions capable of:

attempting, by a process, to access a resource including determining whether a current value of a key in a registry represents an unlocked state for the resource, wherein the registry is accessible by computer program instructions that execute on the host computer architecture and computer program instructions that execute on the accelerator architecture;

if the current value of the key in the registry represents an unlocked state for the resource, attempting, by the process, to lock access to the resource including setting the value of the key to a unique identification of the process attempting to access the resource;

determining, by the process, whether the current value of the key is the unique identification of the process attempting to access the resource; and if the current value of the key is the unique identification of the process attempting to access the resource, accessing the resource by the process.

8. The hybrid computing environment of claim 7 wherein the process attempting to access the resource further comprises a process for a host application program executing on the host computer.

9. The hybrid computing environment of claim 7 wherein the process attempting to access the resource further comprises a process executing on an accelerator.

10. The hybrid computing environment of claim 7 further comprising computer program instructions capable of, upon completing access of the resource by the process, unlocking, by the process, access to the resource including setting the value of the key to represent an unlocked state for the resource.

11. The hybrid computing environment of claim 7 further comprising computer program instructions capable of locking, by the system level message passing module, all access to the resource including setting the value of the key to a value other than a unique identification of any of the processes or an unlocked state.

12. The hybrid computing environment of claim 7 wherein the host computer is adapted to each accelerator for data communications by two or more data communications fabrics of at least two different fabric types.

13. A computer program product for synchronizing access to resources in a hybrid computing environment, the hybrid computing environment comprising a host computer having a host computer architecture, and a plurality of accelerators having an accelerator architecture, wherein the host computer architecture and the accelerator architecture are different architectures such that computer program instructions compiled for execution on the host computer cannot be executed natively by the plurality of accelerators of the hybrid computing environment, the host computer and the accelerators adapted to one another for data communications by a system level message passing module, the computer program product disposed in a recordable computer readable medium, wherein the recordable computer readable medium is not a signal, the computer program product comprising computer program instructions capable of:

attempting, by a process, to access a resource including determining whether a current value of a key in a registry represents an unlocked state for the resource, wherein the registry is accessible by computer program instructions that execute on the host computer architecture and computer program instructions that execute on the accelerator architecture;

if the current value of the key in the registry represents an unlocked state for the resource, attempting, by the process, to lock access to the resource including setting the value of the key to a unique identification of the process attempting to access the resource;

determining, by the process, whether the current value of the key is the unique identification of the process attempting to access the resource; and if the current value of the key is the unique identification of the process attempting to access the resource, accessing the resource by the process.

14. The computer program product of claim 13 wherein the process attempting to access the resource further comprises a process for a host application program executing on the host computer.

15. The computer program product of claim 13 wherein the process attempting to access the resource further comprises a process executing on an accelerator.

16. The computer program product of claim 13 further comprising computer program instructions capable of, upon completing access of the resource by the process, unlocking, by the process, access to the resource including setting the value of the key to represent an unlocked state for the resource.

17. The computer program product of claim 13 further comprising computer program instructions capable of locking, by the system level message passing module, all access to the resource including setting the value of the key to a value other than a unique identification of any of the processes or an unlocked state.

18. The computer program product of claim 13 wherein the host computer is adapted to each accelerator for data communications by two or more data communications fabrics of at least two different fabric types.

* * * * *